United States Patent
Solomond et al.

[11] Patent Number: 6,155,544
[45] Date of Patent: Dec. 5, 2000

[54] VEHICLE SHOCK ABSORBER AND STRUT DAMPER SPRING SEAT PAD HAVING A DISCONTINUOUS SPRING SEAT SURFACE

[75] Inventors: Jonathan P. Solomond, Farmington Hills; Michael S. Weaver, Clarkston; James J. Johnson, Metamora, all of Mich.

[73] Assignee: Chrysler Corporation, Auburn Hills, Mich.

[21] Appl. No.: 09/169,631

[22] Filed: Oct. 9, 1998

[51] Int. Cl.⁷ .................................................... B60G 13/00
[52] U.S. Cl. .......................... 267/220; 267/33; 267/170; 280/124.155
[58] Field of Search ............................... 267/140.11, 220, 267/219, 221, 33, 170, 141.1, 141.3, 141.4, 292; 280/124.154, 124.155; 188/322.11

[56] References Cited

U.S. PATENT DOCUMENTS

| | | | |
|---|---|---|---|
| 3,051,469 | 8/1962 | Boschi | 267/33 |
| 4,721,325 | 1/1988 | Mackovjak et al. | 280/668 |
| 5,249,781 | 10/1993 | Wohler | 267/33 |
| 5,308,048 | 5/1994 | Weaver et al. | 267/220 |
| 5,454,585 | 10/1995 | Dronen et al. | 280/660 |
| 5,676,355 | 10/1997 | Hayashi et al. | 267/221 |

*Primary Examiner*—Michael Mar
*Assistant Examiner*—Pamela J. Lipka
*Attorney, Agent, or Firm*—Lawrence J. Shurupoff

[57] ABSTRACT

The coil spring of a vehicle shock absorber can be seated on an elastomeric sound isolator pad whose spring engagement surface has plural slot-like depressions evenly spaced around the pad circumference. These slot-like depressions form raised ribs that provide the contact surfaces for the lowermost convolution of the coil spring. Each rib can readily deform under the spring force. Side surfaces of the ribs can act as heat-dissipating surfaces. The slot construction allows the pad to be formed out of a reasonably high durometer and highly wear-resistant elastomer without adversely affecting the desired rib deflection.

2 Claims, 3 Drawing Sheets

VEHICLE SHOCK ABSORBER AND STRUT DAMPER SPRING SEAT PAD HAVING A DISCONTINUOUS SPRING SEAT SURFACE

CROSS REFERENCE TO RELATED PATENT APPLICATIONS

This patent application discloses an invention that is closely related to inventions disclosed in our patent application Ser. No. 09/169,247, filed on Oct. 9, 1998 now U.S. Pat. No. 6,079,700.

BACKGROUND AND SUMMARY OF THE INVENTION

This invention relates to a vehicle wheel suspension, and particularly to an annular elastomeric pad for seating the lower end of a coil spring that surrounds a shock absorber strut for the wheel suspension.

Wheel suspensions of interest are shown in U.S. Pat. No. 4,721,325 to J. Mackovjak, U.S. Pat. No. 5,454,585 to G. Dronen et.al., and U.S. Pat. No. 5,676,355 to N. Hayashi.

The vehicle suspension of particular interest comprises a shock absorber strut that includes an upstanding fluid cylinder having a piston rod connected to the vehicle body and a shock absorbing cylinder connected to the vehicle wheel suspension arm. The vehicle suspension further includes an upper spring seat and strut mount assembly attached to the piston rod and a lower spring seat attached to the shock absorbing cylinder. A coil spring is trained between the two spring seats in surrounding relation to the shock absorber strut. The axis of the spring is offset from the axis of the shock absorber strut.

The present invention relates to the construction of the lower spring seat isolator, whereby the isolator material is resiliently deformable while at the same time being formed of a reasonably high durometer material. The seat structure is thus resistant to failure from the forces imposed thereon by the cyclic compression and relaxation of the spring.

In a preferred practice of the invention the lower spring seat isolator has an annular spring seat surface formed with an array of evenly spaced slot-like depressions spaced around the seat circumference. The depressions form raised ribs on the spring seat that can deform radially, vertically, and circumferentially under spring load forces, even when the seat is formed of a relatively high durometer elastomeric material.

Further features of the invention will be apparent from the attached drawings and description of an illustrative embodiment of the invention.

DESCRIPTION OF A PREFERRED EMBODIMENT OF THE INVENTION

Figure 1:
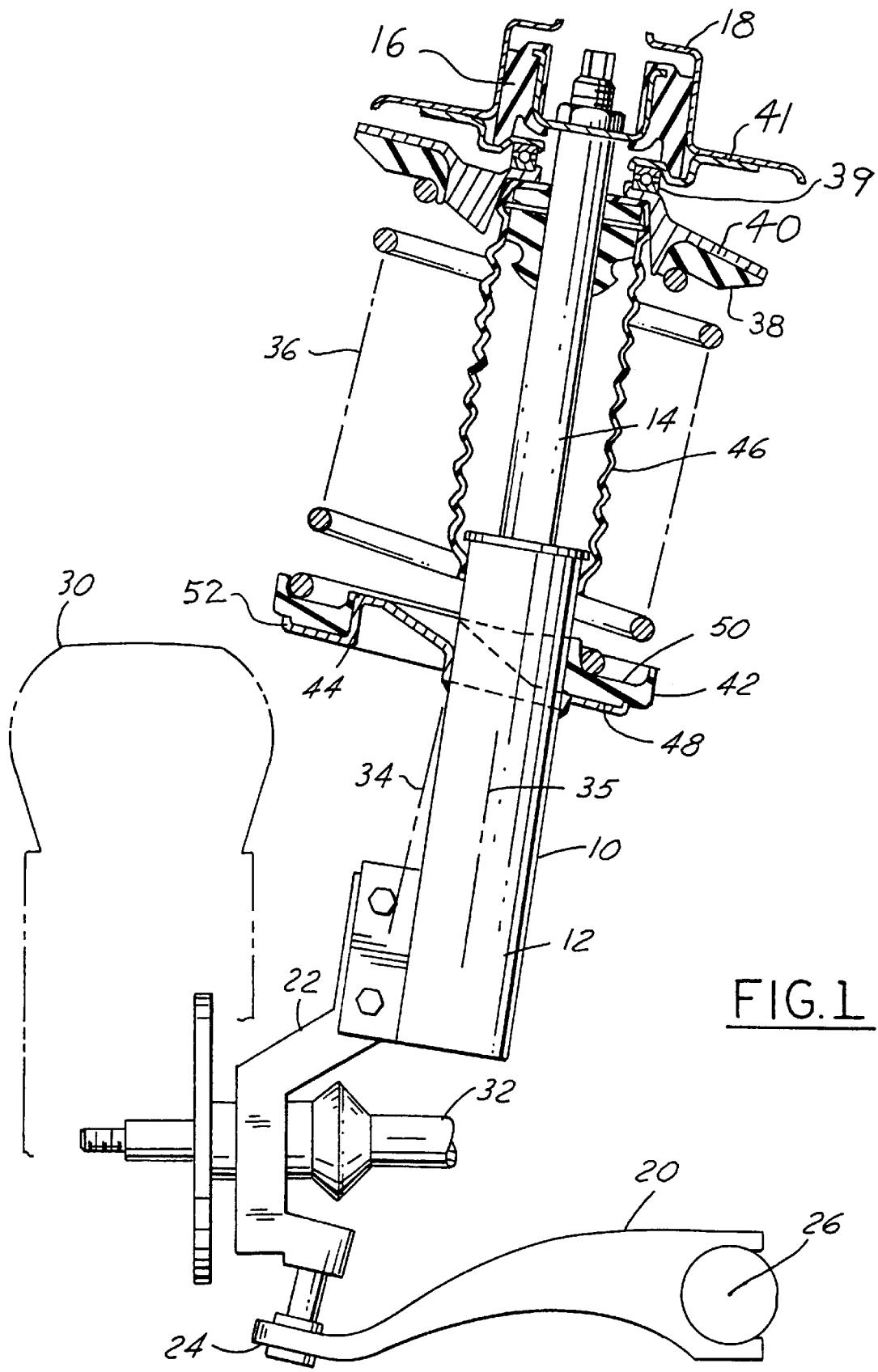
FIG. 1 is a longitudinal sectional view of a vehicle wheel suspension embodying an elastomeric spring seat pad constructed according to the invention.
Figure 3:
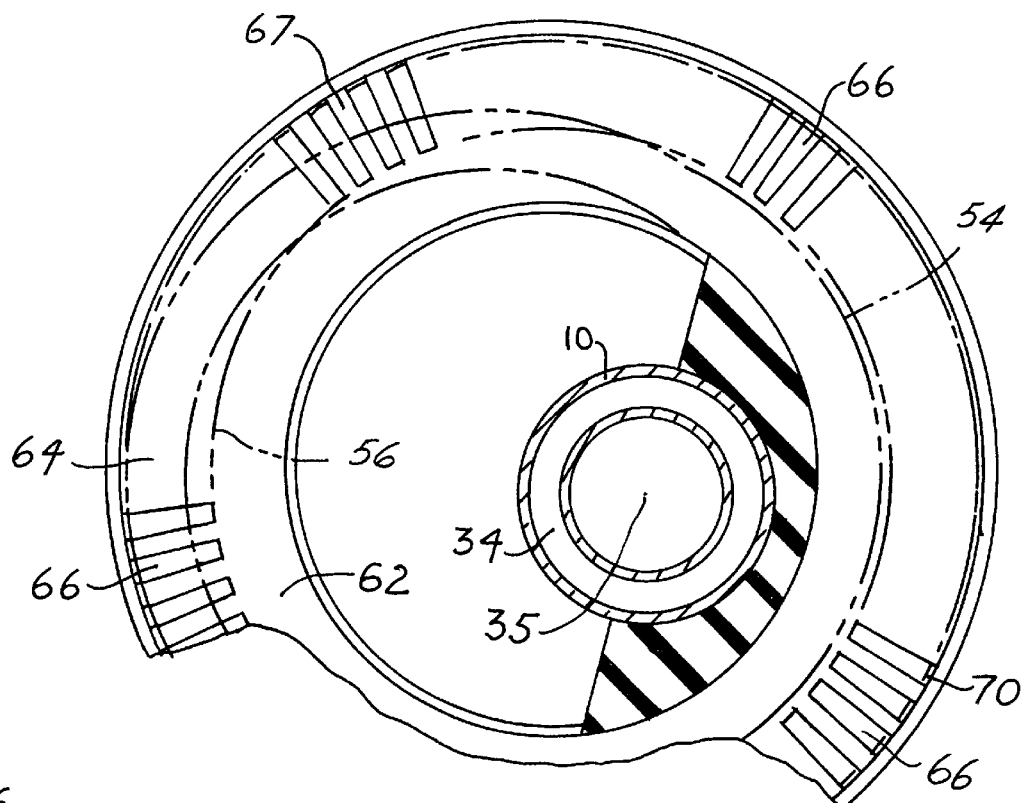
FIG. 3 is a fragmentary sectional view taken on line 3—3 in FIG. 2.
Figure 2:
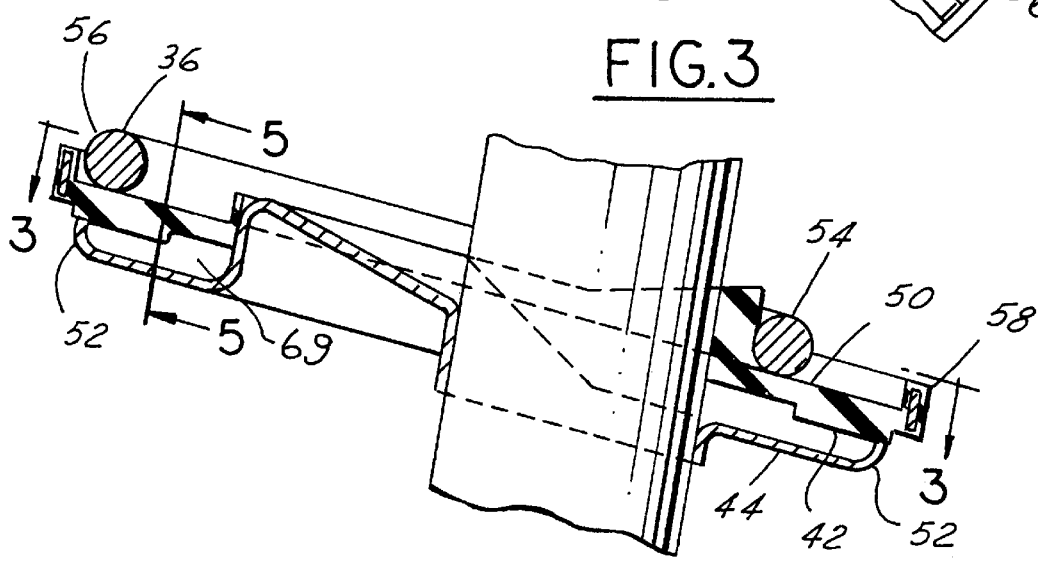
FIG. 2 is a fragmentary enlarged sectional view taken in the same direction as FIG. 1, but showing the elastomeric spring seat pad in greater detail.
Figure 4:
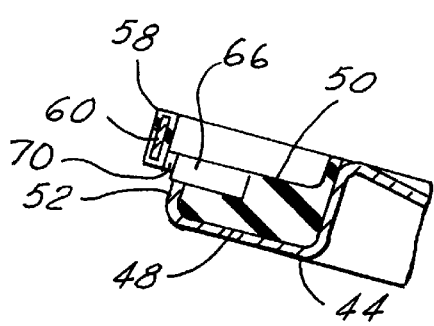
FIG. 4 is a fragmentary sectional view taken in a plane slightly offset from the plane of FIG. 2.

Referring to FIG. 1, there is shown a vehicle wheel suspension that includes a shock absorber strut 10 having a fluid cylinder 12 and piston rod 14. The upper end of piston rod 14 has an elastic connection 16 with a vehicle body 18. The lower end of fluid cylinder 12 is connected to wheel suspension arm 20 via a bracket 22.

Bracket 22 has a ball-socket connection 24 with suspension arm 20. The suspension arm has a pivot connection 26 with the vehicle frame, whereby arm 20 can pivot around axis 26 in accordance with changes in the vehicle wheel position due to terrain irregularities.

Wheel 30 (shown in dashed lines) has an axle 32 that is rotatable in suitable bearings carried by bracket 22. The wheel can be steered around an axis 34 extending through ball-socket joint 24 by a steering arm, not shown. Shock absorber strut 10 has a longitudinal axis 35 angularly offset from steering axis 34.

An annular coil spring 36 surrounds shock absorber strut 10 so as to be compressed by a decrease in the strut length. The coil spring generates a counteracting restoring force tending to maintain the vehicle body in a reasonably level attitude in spite of changes in shock absorber strut length associated with terrain irregularities.

The upper end of coil spring 36 is seated against an elastomeric noise isolator pad 38 carried on an upper platform. The upper spring seat/platform (40) is free to rotate around the piston rod by a bearing assembly 39. The bearing assembly is also in contact with the upper strut mount 41, which is suitably attached to piston rod 14. The lower end of coil spring 36 is seated against an elastomeric isolator pad 42 carried on a lower rigid platform 44 suitably attached to cylinder 12. Platforms 40 and 44 are preferably steel stampings.

Platform 44 and elastomeric isolator pad 42 are constructed so that the axis 34 of coil spring 36 is angularly offset form the axis 35 of the shock absorber. In the illustrated position of the vehicle wheel, the spring axis is coincident with steering axis 34.

The illustrated wheel suspension includes an annular bellows type dust cover 46 surrounding the piston rod 14 and a portion of cylinder 12, so as to exclude dirt from the piston rod-cylinder joint. The upper end of dust cover 46 is anchored to the upper spring seat 40. The lower end of dust cover 46 rests against an upper surface of the lower elastomeric pad 42.

The present invention relates to the construction of elastomeric pad 42, whereby the pad can be formed of a reasonably high durometer material while at the same time being significantly deformable under the cyclic forces imposed by coil spring 36.

Pad 42 has a bottom surface 48 fitting on the upper surface of platform 44. A lip 52 on platform 44 surrounds the bottom surface of the pad to maintain the pad against lateral dislocation. Coil spring 36 seats against an upper flat surface 50 formed on pad 42.

The lowermost convolution of spring 36 includes an inner circular section 54 located in near proximity to the strut 10 side surface and an outer arcuate section 56 joined to section 54 by a spiral section. During full compression of the spring, a portion of the second spring convolution bottoms on seat surface 50 outside (alongside) circular section 54.

Annular surface 50 on elastomeric pad 42 includes an annular inner surface area 62 (engaged with spring section 54) and an annular outer surface area 64 (engaged with spring section 56). Surface area 64 has a plurality of circumferantially-spaced slot-like depressions 66 radiating away from the pad axis 34, such that coil section 56 has a discontinuous engagement with seat surface 64. Radial slots 66 form upwardly facing ribs 67 that provide the engagement areas for the spring.

Ribs 67 have unsupported radial side surfaces that allow the ribs to resiliently deform under spring pressure. Spring forces are allowed to dissipate, instead of being transformed into internal heat within the elastomeric material.

The elastomeric pad can be formed of a relatively high durometer material (and thus a highly wear-resistant material) without adversely interfering with the desired resilient deformation of ribs 67.

As a cost-saving feature, the bottom surface 48 of pad 42 may be formed with plural evenly-spaced grooves 69 extending radially around the entire pad circumference. These grooves reduce the amount of elastomeric material used in the pad, and hence the overall cost of the pad. Additionally, grooves 69 act as heat dissipating surfaces for heat that might otherwise build up in the pad.

Figure 5:
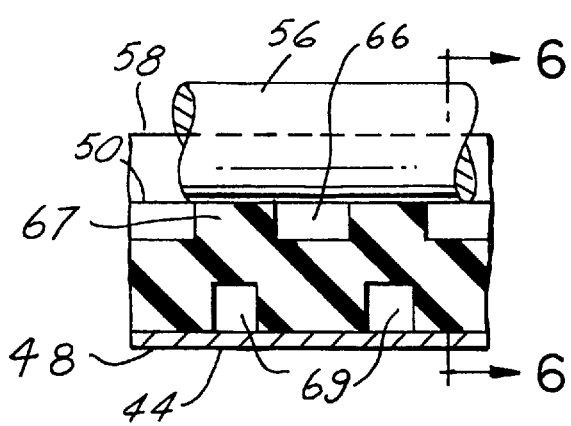
FIG. 5 is a fragmentary transverse sectional view taken on line 5—5 in FIG. 2.
Figure 6:
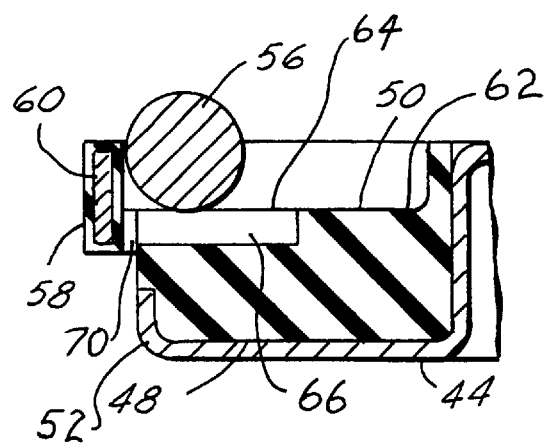
FIG. 6 is a fragmentary sectional view taken on line 6—6 in FIG. 5.

As shown in FIG. 5, each groove 69 is located directly below one of the ribs 67, such that the grooves are offset circumferentially from slots 66. The opposing locations of rib 67 and groove 69 allows greater resilient deformation and therefore sound absorption and heat dissipation with the high durometer material.

To prevent water from collecting in slots 66, each slot 66 is provided with a drainage hole 70 located in near proximity to peripheral flange 58 on the pad. Water in any slot 66 can drain through hole 70 into the space surrounding support platform 44.

What is claimed:

1. A vehicle wheel suspension comprising:

an upstanding shock absorber strut; an annular upwardly facing rigid platform (44) affixed to said strut, said platform having an up-turned peripheral lip (52); an annular elastomeric spring seat pad (42) positioned on said platform, said pad having a lower portion thereof confined against radial dislocation by said up-turned peripheral lip; said elastomeric pad having an upwardly facing spring seat surface (50) that includes an inner continuous annular surface area (62) and an outer discontinuous annular surface area (64), said outer discontinuous surface area being formed by plural radial slots (66) evenly spaced around the pad circumference in the spring seat surface; and a helical coil spring (36) surrounding said strut, said coil spring having a lowermost convolution that includes an inner circular end section (54) seated on said inner surface area, an outer arcuate section (56) seated on said outer surface area, and a spiral section joining said inner section to said outer section; a portion of said outer discontinuous surface area being aligned with a second convolution of the helical spring to act as a seating surface for the second spring convolution when the spring is fully compressed.

2. The vehicle wheel suspension of claim 1 and further comprising a water drainage hole (70) extending downwardly through said pad from each said radial slot; each drainage hole being located radially, outwardly beyond the peripheral lip on said platform.

\* \* \* \* \*